(12) United States Patent
Simon et al.

(10) Patent No.: US 12,247,121 B2
(45) Date of Patent: Mar. 11, 2025

(54) CURABLE EPOXY COMPOSITION AND ITS USE IN PREPREGS AND CORE FILLING

(71) Applicant: Von Roll Schweiz AG, Breitenbach (CH)

(72) Inventors: Hubert Simon, Buhl (FR); Markus Rudin, Frenkendorf (CH); Nicolas Mullot, Uffheim (FR)

(73) Assignee: Von Roll Schweiz AG (DE)

( * ) Notice: Subject to any disclaimer, the term of this patent is extended or adjusted under 35 U.S.C. 154(b) by 850 days.

(21) Appl. No.: 17/437,479

(22) PCT Filed: Mar. 10, 2020

(86) PCT No.: PCT/EP2020/056285
§ 371 (c)(1),
(2) Date: Sep. 9, 2021

(87) PCT Pub. No.: WO2020/182781
PCT Pub. Date: Sep. 17, 2020

(65) Prior Publication Data
US 2022/0153988 A1 May 19, 2022

(30) Foreign Application Priority Data
Mar. 11, 2019 (EP) .................... 19161799

(51) Int. Cl.
*C08G 59/32* (2006.01)
*C08G 59/14* (2006.01)
(Continued)

(52) U.S. Cl.
CPC .............. *C08L 63/04* (2013.01); *C08G 59/14* (2013.01); *C08G 59/3218* (2013.01); *C08G 59/4021* (2013.01); *C08J 5/244* (2021.05); *C08J 5/249* (2021.05); *C08K 3/22* (2013.01); *C08K 3/36* (2013.01); *C08K 3/38* (2013.01); *C08K 5/19* (2013.01); *C08K 5/521* (2013.01); *C08K 5/5373* (2013.01); *C08J 2363/04* (2013.01); *C08K 2003/2217* (2013.01); *C08K 2003/2227* (2013.01); *C08K 2201/019* (2013.01); *C08L 2201/02* (2013.01)

(58) Field of Classification Search
CPC ..... C08L 63/04; C08L 2201/02; C08G 59/14; C08G 59/3218; C08G 59/4021; C08G 59/686; C08J 5/244; C08J 5/249; C08J 2363/04; C08K 3/22; C08K 3/36; C08K 3/38; C08K 5/19; C08K 5/521; C08K 5/5373; C08K 2003/2217; C08K 2003/2227; C08K 2201/019; B32B 2262/101; B32B 3/12; B32B 2264/0242; B32B 5/26; B32B 2250/40; B32B 2260/021; B32B 19/06; B32B 29/02; B32B 2264/10; B32B 2264/105; B32B 5/022; B32B 5/028; B32B 2260/028; B32B 2260/046; B32B 2262/0269; B32B 2262/10; B32B 2262/106; B32B 2264/102; B32B 2264/108; B32B 2307/3065; B32B 2307/718; B32B 2457/00; B32B 2603/00; B32B 2605/08; B32B 2605/12; B32B 2605/18; B32B 5/024; B32B 7/12; B32B 19/046
See application file for complete search history.

(56) References Cited

U.S. PATENT DOCUMENTS 4,127,590 A 11/1978 Endo et al.
4,283,520 A 8/1981 Moser et al.
(Continued)

FOREIGN PATENT DOCUMENTS

CN 107286583 A 10/2017
DE 2646218 A1 4/1977
(Continued)

OTHER PUBLICATIONS

Oyanguren P.A. et al., "Analysis of the epoxidation of bisphenol A and phenolic Novolacs with epichlorohydrin", vol. 33(11): 2376-2381 (1992).
Airbus Standard, AIMS Airbus Material Specification "Woven glass fiber reinforced thermoset prepreg Flame retarded (FST) E-glass, 8 shaft satin, 296 g/m² Resin mass content 40%", AIMS05-10-001, Issue 7: 1-10 (2015).
Airbus Standard, AIMS Airbus Material Specification "Fiber reinforced (woven) thermosetting preimpregnated materials for aircraft parts (e.g. interior) subject to FST—requirements—thermosettingsystems—glass (E-glass fiber; 105 g/m2; 4 shaft satin)—Resin mass content 53%", AIMS05-10-008, Issue 4: 1-10 (2004).
Airbus Standard, AIMS Airbus Material Specification "Fiber reinforced (woven) thermosetting preimpregnated materials for aircraft parts (e.g. interior) subject to FST—requirements—thermosettingsystems—glass (E-glass fiber; 105 g/m2; 4 shaft satin)—Resin mass content 40%", AIMS05-10-009, Issue 4: 1-10 (2004).
(Continued)

Primary Examiner — Katarzyna I Kolb

(57) ABSTRACT

A curable composition comprising: i) a glycidyl ether of a novolac, comprising or consisting of moieties having the formula (I), wherein —$R_a$ is either always hydrogen or always methyl; —B is either always *—CH2-** or always formula (A); —a fraction of 0.8 to 0.99 of the Y moieties are essentially —O-glycidyl, this fraction being designated as x, and the remainder of the Y moieties, this fraction being designated as (1-x), are divalent bridging spacers of the structure *—O—$CH_2$—CH(OH)—$CH_2$—O—** connecting two moieties according to above formula (I); and—n is a number in the range of 0.1 to 3.0; and wherein said novolac glycidyl ether has an epoxy equivalent weight FEW in the range of 160 to 270 g/eq. and the average number of epoxy groups per molecule of novolac glycidyl ether (I), designated as f, is in the range of 2.1 to 5.0; ii) dicyandiamide; and iii) an urea derivative of the formula (II). This composition is stable upon storage at room temperature and fire-retardant. It can be used for preparation of prepregs and in core filling, particularly in the aerospace field.

16 Claims, No Drawings

(51) Int. Cl.

| | |
|---|---|
| *C08G 59/40* | (2006.01) |
| *C08J 5/24* | (2006.01) |
| *C08K 3/22* | (2006.01) |
| *C08K 3/36* | (2006.01) |
| *C08K 3/38* | (2006.01) |
| *C08K 5/19* | (2006.01) |
| *C08K 5/521* | (2006.01) |
| *C08K 5/5373* | (2006.01) |
| *C08L 63/04* | (2006.01) |

(56) References Cited

U.S. PATENT DOCUMENTS

| | | | |
|---|---|---|---|
| 6,121,412 A | 9/2000 | Wanat et al. | |
| 2006/0035088 A1* | 2/2006 | Takano | C08G 59/504 |
| | | | 428/408 |
| 2008/0185753 A1* | 8/2008 | Takano | C08G 59/18 |
| | | | 524/425 |
| 2008/0185757 A1* | 8/2008 | Takano | C08J 5/249 |
| | | | 264/319 |
| 2008/0187718 A1* | 8/2008 | Takano | C08G 59/56 |
| | | | 428/141 |
| 2009/0202832 A1* | 8/2009 | Takano | C08G 59/56 |
| | | | 524/186 |
| 2015/0098833 A1* | 4/2015 | Pointer | C08J 5/04 |
| | | | 156/308.2 |
| 2016/0222204 A1* | 8/2016 | Wang | C08G 59/56 |

FOREIGN PATENT DOCUMENTS

| | | | | |
|---|---|---|---|---|
| EP | 0407157 A2 | 1/1991 | | |
| EP | 1566394 A1 | 8/2005 | | |
| GB | 1192790 A | 5/1970 | | |
| GB | 1258454 A | 12/1971 | | |
| GB | 2300187 A | 10/1996 | | |
| WO | 85/02184 A1 | 5/1985 | | |
| WO | WO-2004048435 A1 * | 6/2004 | ............ | C08G 59/18 |
| WO | 2014/108305 A2 | 7/2014 | | |
| WO | WO-2020182781 A1 * | 9/2020 | ........... | B32B 19/046 |

OTHER PUBLICATIONS

Airbus Standard, AIMS Airbus Material Specification "Woven glass fiber reinforced thermoset prepreg Flame retarded (FST) E-glass, 8 shaft satin, 296 g/m$^2$ Resin mass content 53%", AIMS05-10-002, Issue 6: 1-10 (2015).

Datasheet of Airpreg Py 8137, Isovolta Austria, V.005 (2012).

Wang Z. et al., "Hot water-promoted ring-opening of epoxides and aziridines by water and other nucleopliles", Abstract of J. Org. Chem. 73(6): 2270-2274 (2008).

Guthner T. et al., "Curing of epoxy resins with dicyandiamide and urones", Abstract of Journal of Applied Polymer Science 50(8): 1453-1459 (1993).

International Search Report and Written Opinion for PCT/EP2020/056285 (Apr. 20, 2020).

International Preliminary Report on Patentability for PCT/EP2020/056285 (Jun. 9, 2021).

\* cited by examiner

CURABLE EPOXY COMPOSITION AND ITS USE IN PREPREGS AND CORE FILLING

This application is a US National Stage application of PCT International patent application No. PCT/EP2020/056285, filed Mar. 10, 2020, which claims the benefit of priority to European Patent Application No. 19161799.2, filed Mar. 11, 2019, which applications are incorporated herein by reference. To the extent appropriate, a claim of priority is made to each of the above disclosed applications.

TECHNICAL FIELD

The present invention relates to a curable composition containing an epoxy resin, its use in prepreg manufacture, and its use in filling of cores or in sealing of edges of trusses, such as honeycombs. The present invention in particular relates to such prepregs and such edge sealing or core filling in the field of transportation industry.

BACKGROUND ART

Curable resin compositions including an epoxy resin are well known. Depending on the type of epoxy resin (that is, its epoxy equivalent weight, its molecular weight and viscosity and other structural features) such curable composition may either be liquid or semi-solid. It is also known to pre-cure such compositions to a B-stage of the epoxy resin. Common applications of such curable epoxy resin compositions are as adhesives and in prepregs that can be further processed to moulded, fully cured articles.

"Prepreg" is the term used in the art to describe a composite of fibres, optionally in the form of a fabric, which are impregnated with a curable resin in the uncured or possibly B-staged form. The fibres may be in the form of tows or fabrics and a tow generally comprises a plurality of thin fibres called filaments. The fibrous materials and resins employed in the prepregs will depend upon the properties required of the cured fibre reinforced material and also the use to which the cured laminate is to be put. The fibrous material is described herein as structural fibre. The resin may be combined with fibres or fabric in various ways. The resin may be tacked to the surface of the fibrous material. The resin may partially or completely impregnate the fibrous material. The resin may impregnate the fibrous material so as to provide a pathway to facilitate the removal of air or gas during processing of the prepreg material. The curing is typically done in a mould having the shape of the final article, which allows for simultaneous shaping of the prepreg into the desired article shape, normally at an elevated temperature below the curing temperature of the resin, and then the curing thereof at the said curing temperature. Conventional prepregs require cold storage because at ambient temperatures they will slowly proceed to cure. This is a major inconvenience associated with conventional prepregs. The duration for which a prepreg can be stored before the resin has cured to such an extent that it is no longer suitable for use is referred to as its 'outlife'.

"Core filling" and "edge sealing" are terms commonly used in the field of structural composites. "Core filling" relates to the filling of voids in a rigid supporting structure, of typically three-dimensional shape. The supporting structure is normally made up of metal, such as steel or aluminium, or of impregnated aramid, and may be in the form of a truss, beam or plate or any other shape resembling a final article. A very common shape s a honeycomb structure. Here, the curable composition is used to fill the interstices and voids in the supporting structure (in the case of a honeycomb the "cores"). Hereto, the supporting structure may be placed in a mould having the shape of a finished desired article. After curing the resin, an moulded and shape article is obtained, made up of the cured resin and containing the supporting structure as a reinforcing skeleton. Such moulded articles are particularly useful in the aerospace field, because of their low weight with nevertheless high mechanical rigidity. "Edge sealing" relates either to the repairing of a damage in the surface of an article, such as a hole, or to the sealing of the gap between the surfaces of two adjacent parts or articles. Here the curable composition acts primarily as an adhesive.

A common epoxy resin that is used for the above purposes are glycidyl ethers of novolacs. There is an enormous range of commercially available glycidyl ethers of novolacs, differing from each other with respect to many parameters, such as epoxy equivalent weight (EEW), viscosity, type of novolac backbone (e.g. whether from phenol or from a cresol; and type of bridging spacer between the aromatic nuclei), average number of epoxy groups per molecule, extent of conversion of the phenolic hydroxyls to glycidyl ethers, and curing behaviour. Such glycidyl ethers of novolacs are always mixtures of homologues of varying novolac chain length, in which one homologue is predominant to some extent. These technical products also contain additives and undefined impurities. The exact composition of such commercial products is normally kept secret as know-how of the respective producer. National legislation at the most imposes on the producers a duty to disclose CAS numbers of the relevant components, but in the case of novolac epoxy resins such CAS numbers are not specific for a single molecule. In such secrecy policy, producers also rely on the difficulty or even impossibility to completely analyse such technical products.

As with any epoxy resin, glycidyl ethers of novolacs need a hardener. The term "latent hardener" implies that the accelerator is essentially inactive at room temperature bit will become active at elevated temperatures. A common latent hardener for epoxy resins is dicyandiamide. The dicyandiamide data sheet by Brenntag recommends to use 6-8 phr of dicyandiamide for an epoxy resin with epoxide equivalent weight of 190, which corresponds to a recommended ratio of 0.14-0.18 molecules of dicyandiamide per epoxy unit. Journal of Applied Polymer Science, 50(8), pp. 1453-1459 (1993) indicates a ratio of 1/7 molecule of dicyandiamide per epoxy unit as the optimal stoichiometry for epoxy curing. Other known latent hardeners are amine hardeners, specific example of such latent amine accelerator being Ancamine 2014 A S. These amine hardeners may be used in combination with dicyandiamide, to accelerate the dicyandiamide. The datasheet of said Ancamine 2014 AS recommends for such combined use 4-8 phr dicyandiamide and 3-7 phr Ancamine 2014 AS, when used for an epoxy resin with epoxide equivalent weight of 190. This corresponds to a recommended ratio of 0.09-0.18 molecules of dicyandiamide per epoxy unit in such combination. Adding even a latent hardener to an epoxy composition normally implies that the composition must be stored below room temperature, to prevent the latent hardener from starting to cure the composition.

Epoxy resins are commonly also cured in presence of a dedicated latent curing accelerator. There are many types of such latent accelerators, such as amines, amides, Lewis acids, and others. Amine accelerators are optionally pre-reacted with a monomeric epoxide. A preferred known class of latent accelerators are urea-based accelerators (urons).

The said datasheet of Ancamine 2014 AS also recommends for such combined use 2-3 phr dicyandiamide, 4-8 phr Ancamine 2014 AS and 3-5 phr uron-based accelerator, when used for an epoxy resin with epoxide equivalent weight of 190. This corresponds to a recommended ratio of 0.05 to 0.07 molecules of dicyandiamide per epoxy unit in such ternary combination Particularly in the aerospace field, fire retardancy of cured epoxy compositions is desirable. In order to impart such fire retardancy, it has been customary to add fire retardant compounds, such as halogenated aromatics, phosphonic acid derivatives or inorganics to an epoxy resin before final cure. These fire retardant compounds may however adversely affect the curing behaviour of an epoxy resin.

EP 1 566 394 discloses first and second embodiments of compositions containing epoxy resin, dicyandiamide and uron accelerators. The epoxy resin may be a phenol or cresol type epoxy resin. Exemplified are Epiclon N-740 and Pheno Tohto YCDN701.

The present invention seeks to provide an improved one-component curable composition containing a glycidyl ether of novolacs, which is both storage-stable at room temperature and which in the cured state is fire retardant.

SUMMARY OF INVENTION

The present invention thus provides a curable composition comprising:

i) a glycidyl ether of a novolac, comprising or consisting of moieties having the formula (I):

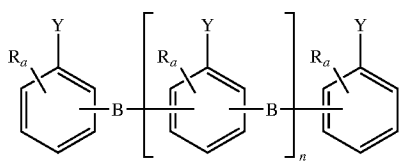

wherein $R_a$ is either always hydrogen or always methyl;

B is either always *—$CH_2$—** or always

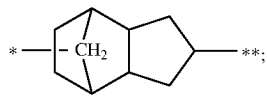

a fraction of 0.8 to 0.99 of the Y moieties are essentially —O-glycidyl, this fraction being designated as x, and the remainder of the Y moieties, this fraction being designated as (1-x), are divalent bridging spacers of the structure *—O—$CH_2$—CH(OH)—$CH_2$—O—** connecting two moieties according to above formula (I); and n is a number in the range of 0.1 to 3.0;

and wherein said novolac glycidyl ether has an epoxy equivalent weight EEW in the range of 160 to 270 g/eq. and the average number of epoxy groups per molecule of novolac glycidyl ether (I), designated as f, is in the range of 2.1 to 5.0;

ii) dicyandiamide; and
iii) an urea derivative of the formula (II):

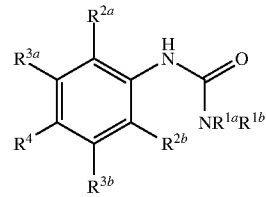

wherein $R^{1a}$ and $R^{1b}$ may be equal or different and are individually selected from the group of hydrogen, $C_1$-$C_6$-alkyl and $C_3$-$C_6$-cycloalkyl; or $R^{1a}$ and $R^{1b}$ taken together with the nitrogen atom to which they are attached form a heterocyclic substituent selected from the group consisting of aziridinyl, azetidinyl, pyrrolidinyl and piperidinyl;

$R^{2a}$ and $R^{2b}$ are equal or different and are individually selected from the group consisting of hydrogen and $C_1$-$C_6$-alkyl;

$R^{3a}$, $R^{3b}$ and $R^4$ are equal or different and are individually selected from the group consisting of hydrogen, halogen, $C_1$-$C_6$-alkyl, $C_1$-$C_6$-alkoxy, —C(O)$R^5$, —N(H)—C(O)—N$R^{1a}R^{1b}$, —CN, $NO_2$, trifluoromethyl, —SO$R^6$ and $SO_2R^6$; wherein $R^5$ is selected from the group consisting of hydrogen, $C_1$-$C_6$-alkyl, $C_1$-$C_6$-alkoxy, $C_3$-$C_6$-cycloalkyl and N$R^{1a}R^{1b}$, and $R^6$ is selected from the group consisting of $C_1$-$C_6$-alkyl, $C_1$-$C_6$-alkoxy and $C_3$-$C_6$-cycloalkyl; and iv) optionally, one or more epoxy-containing reactive diluents being selected from the group consisting of glycidyl ethers of monohydric phenols, glycidyl ethers of cresols, diglycidyl ethers of bisphenol A or F, and glycidyl ethers of aliphatic or cycloaliphatic $C_{4-8}$-alcohols.

Preferred embodiments are according to the dependent claims.

DETAILED DESCRIPTION OF THE INVENTION

The composition of the present invention contains as first essential component a novolac glycidyl ether comprising or consisting of moieties having the formula (I) wherein the average number of epoxy groups per molecule of novolac glycidyl ether, designated as f, is in the range of 2.1 to 5.0. Said f is for the purposes of the invention obtained as follows:

$$f \equiv \frac{\overline{M_g}}{EEW}$$

wherein $\overline{M_g}$ is the number average molecular weight of the novolac glycidyl ether; which for the purposes of the invention may be determined by size exclusion chromatography (SEC) on HPLC columns of 300 mm length and containing Waters Ultrastyragel® GPC of 5 micrometres particle size and pore size 100 or 500 Angstroms; and using a Waters 510 HPLC pump with mobile phase THF at 1 ml/min; and using refractive index detection; and the EEW is a defined above.

The n appearing in formula (I) is calculated for the purposes of the invention as n=f−2, wherein f is as define above.

Preferably in formula (I), firstly B is always *—CH$_2$—** and R$_a$ is hydrogen or methyl; more preferably here both B and R$_a$ are ortho with respect to the Y. Alternatively in formula (I), preferably B is always

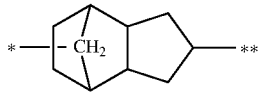

and R$_a$ is always hydrogen; more preferably here, B is ortho with respect to Y.

The composition of the invention preferably comprises the novolac glycidyl ether in an amount in the range of 30 to 70% by weight, based on the composition, more preferably of 40 to 60% by weight.

The x appearing in formula (I) is calculated for the purposes of the invention as $$x = \frac{L_B + R_B - 2U_B + U_B\left(\frac{\overline{M_g}}{EEW}\right)}{\overline{M_g}\left(1 + \frac{1}{EEW}(U_B - U)\right)}$$

wherein
- L$_B$ is the molecular weight of the left terminus in formula (I), with Y=*—O—CH$_2$—CH(OH)—CH$_2$—O—**, but wherein the molecular weight of that Y is counted only half;
- R$_B$ is the molecular weight of the right terminus in formula (I), with Y=*—O—CH$_2$—CH(OH)—CH$_2$—O—**, but wherein the molecular weight of that Y is counted only half;
- U$_B$ is the molecular weight of the repetitive unit in formula (I), with Y=*—O—CH$_2$—CH(OH)—CH$_2$—O—**, but wherein the molecular weight of that Y is counted only half;
- U is the molecular weight of the repetitive unit in formula (I), with Y=glycidyl; and EEW and $\overline{M_g}$ are as defined and measured above.

This formula assumes that the fraction x is composed entirely of glycidyl groups. Other groups arising from hydrolysis of glycidyl groups and chloride attack on the glycidyl groups (see immediately below) do not differ in molecular weight from glycidyl to such an extent and are not so frequent that they would need separate treatment in the above formula.

A fraction x of the Y moieties, that fraction being as calculated by the above formula, are essentially glycidyl groups. By "essentially" is meant here that at least 95%, preferably at least 98% of the Y moieties within the fraction x are glycidyl groups. The remainder of the Y moieties within the x fraction may be e.g. *—O—CH$_2$—CH(OH)—CH$_2$—OH groups arising from hydrolysis of glycidyl groups by trace water or *—O—CH$_2$—CH(OH)—CH$_2$—Cl groups arising from nucleophilic attack of chloride on the glycidyl groups. The fraction (1-x) of Y moieties is the degree to which glycidyl groups already introduced into the novolac react further with another phenolic hydroxyl group present on another novolac molecule, to form the said divalent spacer between two novolac polymer chains. The x is for the purposes of the invention always less than 1. It is for the purposes of the invention in the range of 0.8 to 0.95, preferably in the range of 0.8 to 0.9. Accordingly the fraction (1-x) is for the purposes of the invention always greater than 0, namely at least 0.01, and preferably at least 0.05.

Without wishing to be bound by theory, it is possible that the divalent spacers, in particular the aliphatic secondary hydroxy groups contained therein, may affect the latency of the latent accelerator of formula (II) by hydrogen bonding and thus the storage stability of the overall composition of the invention at room temperature. Furthermore of course these secondary hydroxyl groups may affect both the curing speed and the curing degree of the composition of the invention.

It is also observed that the molar ratio of dicyandiamide to epoxy groups that are recommended for neat epoxy resins (see the introduction), can be adapted in essentially unchanged form to curable epoxy resin compositions with appreciable contents of fillers, such as flame retardants, provided that the epoxy resins are of the type specified in instant claim 1. These epoxy resins are of a lower content of epoxy groups (that is, of glycidyl groups), because they contain an appreciable amount of bridging spacers as Y, which spacers are devoid of epoxy. This amount is at least 5% of the Y moieties in formula (I). The use of such less than optimal epoxy resins is advantageous because less care must be taken during their manufacture to prevent said bridging spacer formation, so they are easier and cheaper to make. In particular, the excess of epichlorhydrin over phenolic novolac hydroxyls in the glycidylation reaction can be lowered, thus requiring less excess epichlorhydrin to be removed by distillation after the glycidylation reaction (see above). Nevertheless, in the compositions of the invention the use of such less than optimal epoxy resins results in useful cured products of similar mechanical properties as if made with optimized epoxy resins essentially devoid of such bridging spacers.

It is assumed that essentially all phenolic hydroxyl groups of the starting novolac are converted to O-glycidyl groups and in formula (I) the fraction (1-x) of Y groups are "essentially" divalent spacers *—O—CH$_2$—CH(OH)—CH$_2$—O—**. By "essentially all" is meant at least 95%, more preferably at least 98%.

In formula (I) the spacers B are mostly ortho/ortho with respect to the glycidyl groups of the adjacent phenyl groups to which the B spacers are bound, but some ortho/para and even some para/para bonding may also occur. Furthermore the configuration at the asymmetric glycidyl epoxy carbon atoms is undefined. This indefiniteness is not detrimental for the purposes of the invention but on the other hand are believed to aid in preventing unwanted crystallisation of the novolac glycidyl ether (I) out of the composition of the invention during storage at room temperature.

Concerning the novolac glycidyl ether the invention contemplates three alternate preferred embodiments:
a) Wherein in formula (I) the spacer B is always *—CH$_2$—**; R$_a$ is always hydrogen; and either the EEW is in the range of 169-175 g/eq. and f is in the range of 2.4 to 2.6, or the EEW is in the range of 172-179 g/eq. and f is in the range of 2.7 to 2.9;
b) wherein B is always *—CH$_2$—**; R$_a$ is always methyl; and the EEW is in the range of 210 to 240 g/eq. and f is in the range of 4.5 to 5.0; or
c) wherein B is always

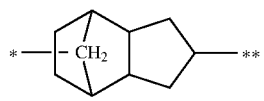

and $R_a$ is always hydrogen; and the EEW is in the range of 210 to 270 g/eq. and f is in the range of 2.0 to 2.5.

The novolac used as starting material for the preparation of the novolac glycidyl ether is on the one hand a phenol-formaldehyde condensation product or a cresol-formaldehyde condensation product. These novolacs are preferably prepared from gaseous formaldehyde, an aqueous solution of 30 to 37% by weight of formaldehyde (formalin) or a formaldehyde precursor such as paraformaldehyde, and phenol (or cresol) with a molar ratio of formaldehyde:phenol (or cresol) of typically 0.1 to 0.3. Acidic catalysts may be used. Examples of the acid catalyst used here include an inorganic acid such as hydrochloric acid, sulfuric acid, and phosphoric acid; an organic acid such as methanesulfonic acid, p-toluenesulfonic acid, and oxalic acid; and a Lewis acid such as boron trifluoride, anhydrous aluminium chloride, and zinc chloride. A preferred catalyst is oxalic acid. The used amount is preferably in the range of 0.001 to 2.0 times on a mole basis relative to the total number of phenolic hydroxy groups. The reaction may be run neat or in toluene solution, optionally with removal of reaction water by distillation or azeotropic distillation. The progress of the reaction may be checked by the potentiometric titration (hydroxylamine hydrochloride procedure) according to norm ISO 11402. Unreacted phenol or formaldehyde may be removed after completion of the reaction, as usual in the art, by steam distillation. Optionally, the reaction product may be separated into a fraction having above n in the above range by the selective precipitation/centrifugation technique described in U.S. Pat. No. 6,121,412 A, included herein by reference.

The novolac used as starting material for the preparation of the novolac glycidyl ether is on the other hand a reaction product of phenol (or a cresol) with dicyclopentadiene. Dicyclopentadiene forms slowly and spontaneously from cyclopentadiene upon standing by Diels-Alder reaction. The reaction between phenol (or cresol) with dicyclopentadiene may be performed either in neat condition or in a solvent, such as a chlorinated hydrocarbon, an aromatic hydrocarbon. The phenol (or cresol) is preferably contacted with dicyclopentadiene in a molar ratio of 10:1 to 1.5:1. The reaction is preferably conducted in presence of a Lewis acid catalyst such as aluminium chloride, zinc chloride or stannic chloride. The reaction temperature is preferably in the range of 33° C. to 210° C., provided that the temperature is chosen such that the dicyclopentadiene does not revert to cyclopentadiene. Excess phenol (or cresol) can be removed after the reaction by steam distillation. Novolacs of this type are disclosed in e.g. WO 85/02184 A1, incorporated herein by reference.

The novolac glycidyl ether may be prepared from the above novolac in the customary way by reacting with epichlorohydrin at a temperature of 80° C. to the boiling point of the epichlorhydrin. The amount of epichlorohydrin may be preferably be chosen such that it is in a 2- to 8-fold molar excess, more particularly in a 3- to 6-fold molar excess, with respect to the mole number of phenolic hydroxyls. The novolac is conveniently dissolved in the excess epichlorohydrin in the absence of solvent and the reaction is run until essential complete conversion of all phenolic hydroxyls, following which excess epichlorohydrin is distilled off under reduced pressure. The reaction is typically run in presence of preferably stoichiometric amounts (with respect to epichlorohydrin) of base. The base may be e.g. a concentrated aqueous alkali metal hydroxide or alkali metal carbonate solution. The reaction temperature is preferably in the range of 50 to 100° C.

However, a non-zero fraction of the original phenolic hydroxyls of the novolac should be converted into bridging spacers of structure *—O—CH$_2$—CH(OH)—CH$_2$—O—**. Such bridge formation is in principle known from Polymer 1992, 33(11), p. 2376-2381 as an unwanted side reaction in novolac glycidyl ether formation. In the instant invention it is desired to a given non-zero extent, said non-zero extent being said (1-x), that is, at least 1%, preferably at least 5%. That means that the excess of epichlorohydrin and the reaction conditions should not be so large that the totality of the original phenolic hydroxyls of the novolac reacts with epichlorhydrin, which would preclude the formation of said bridging spacers. With a reasonable excess of epichlorhydrin intended amounts of bridging spacers near the lower limit of 5% may form automatically without special further precautions. For higher amounts of bridging spaces, near the upper limit wherein (1-x)=20%, it may be advisable in some cases to further lower the excess of epichlorhydrin and/or to remove the excess epichlorhydrin (e.g. by distillation out of the reaction mixture) prematurely after a certain reaction time after which typically a fraction of phenolic hydroxyls close to and perhaps slightly more than (1-x) has not yet reacted with epichlorhydrin, to allow these unreacted phenolic hydroxyls to undergo formation of bridging spacers with already connected glycidyl moieties.

After the conversion of the novolac to the desired degree the reaction mixture may be washed with water at room temperature or, if too viscous at room temperature, at slightly elevated temperature, such as 40° C., in order to remove chloride and other salts. Therefore a halogenide-free novolac glycidyl ether is obtained.

The composition of the invention contains as second essential component dicyandiamide represented by the chemical formula (H$_2$N)$_2$C=N—CN and its tautomer H$_2$NC(NH)=NH—CN. This is a known commercially available epoxide hardener. Incorporation of dicyandiamide in the form of powder is preferable from the viewpoint of its storage stability at room temperature and viscosity stability during prepreg production. Such dicyandiamide is for the purposes of the invention preferably milled and/or micronized down to powder having a $D_{98}$ of 10 micrometres (i.e. 98% of the particles have a diameter of 10 μm or less), whereby the particle size distribution may be determined by laser diffraction. For example, when reinforcement fibre bundles are impregnated with a composition of the invention by applying heat and pressure in the course of prepreg production (see below), impregnation of the composition in fibre bundles can be facilitated by the use of dicyandiamide with such particle size and distribution. The dicyandiamide may optionally contain fumed silica in an amount of typically 1-2% by weight, based on the dicyandiamide, as a flowing and/or processing aid.

The total amount of dicyandiamide, based on the total amount of novolac glycidyl ether (I), optional epoxy-containing reactive diluent(s) and non-epoxy containing ingredients, is designated as $m_d$ (in weight %) and is calculable as $$m_d \equiv 100\left(\frac{m_{dicy}}{m_{dicy} + m_g + \sum_{n=1}^{N} m_n + \sum_{m=1}^{M} m_m}\right)$$

wherein
- $m_{dicy}$ is the amount (in g) of dicyandiamide;
- $m_g$ is the amount (in g) of the novolac glycidyl ether (1);
- $m_n$ is the amount (in g) of the n-th epoxy-containing reactive diluent, and the sum runs over all N types of such reactive diluents; and
- $m_m$ is the amount (in g) of the m-th non-epoxy-containing ingredient, and the sum runs over all M types of non-epoxy-containing ingredients.

The above $m_d$ is preferably in the range of 3.8 to 4.5 weight %, more preferably 4.1 to 4.4 weight %, based on the overall composition.

The molar amount of dicyandiamide, based on the total amount of epoxy units from novolac glycidyl ether (1) and optional epoxy-containing reactive diluent(s), is designated as $m_e$ (in mol %) and is calculable as $$m_e \equiv 100 \frac{m_{dicy}}{MW_{dicy}} \bigg/ \left( \frac{m_g}{EEW_g} + \sum_{n=1}^{N} \frac{m_n}{EEW_n} \right)$$

wherein
- $MW_{dicy}$ is the molecular weight (in g/mol) of dicyandiamide;
- $EEW_g$ is the epoxide equivalent weight (in g/eq.) of the novolac glycidyl ether (I);
- $EEW_n$ is the epoxide equivalent weight (in g/eq.) of the n-th epoxy-containing reactive diluent, and the sum runs over all N types of such reactive diluents which are present in the composition; and
- $m_{dicy}$, $m_g$ and $m_n$ are as defined for above $m_d$.

The above number N of present reactive diluents may also be zero, if the composition does not contain any such reactive diluent. Accordingly then the sum over all N such reaction diluents is not performed at all.

The composition of the invention may optionally also comprise a low temperature latent amine hardener which becomes active at about 100° C. to 150° C., which is basically an adduct obtainable either by reaction of an epoxide with an amine having at least one hydrogen atom connected to the amine nitrogen, or by reaction of an aziridine with water, and having the formula (V):

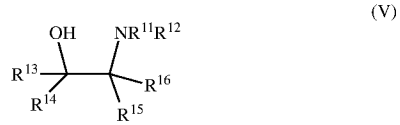
(V)

wherein
- $R^{11}$ and $R^{12}$ are independently selected from hydrogen, $C_{1-6}$alkyl and $-(CH_2)_r(CHR^{18}N(R^{19}R^{20}))R^{21}$ (wherein r is an integer of from 1 to 3; and $R^{18}$, $R^{19}$, $R^{20}$ and $R^{21}$ are independently selected from the group consisting of hydrogen and $C_{1-6}$alkyl); preferably here exactly one of $R^{11}$ and $R^{12}$ is hydrogen;
- $R_{13}$ and $R_{14}$ are independently selected from hydrogen, $C_{1-6}$alkyl and $-(CH_2)OR^{22}$ (wherein $R^{22}$ is selected from the group consisting of phenyl, cresyl and xylyl); preferably here, one of $R^{13}$ and $R^{14}$ is hydrogen and the other one is $-(CH_2)OR^{22}$; and
- $R^{15}$ and $R^{16}$ are independently selected from hydrogen, $C_{1-6}$alkyl and $-(CH_2)_q(CHR^{18}N(R^{19}R^{20}))R^{21}$ (wherein q is an integer of from 0 to 2; and $R^{18}$, $R^{19}$, $R^{20}$ and $R^{21}$ are as defined above); preferably here, at least one of $R^{15}$ and $R^{16}$ is hydrogen.

Preferably such latent amine hardener has an amine value of 170 to 200 mg KOH per g of amine hardener, and an equivalent weight {H+} of 40 to 60 g/eq. Examples of such latent amine hardeners are disclosed e.g. in GB1258454A, WO 2014/108305 and in J. Org. Chem., 2008, 73 (6), pp 2270-2274, included herein by reference. Specific examples of the latent amine hardener of formula (V) are adducts of the glycidyl ethers of phenol, cresol, xylenol or p-tert-butylphenol with aliphatic saturated bifunctional amines.

If dicyandiamide is used without above latent amine hardener of formula (V), then the above $m_e$ is preferably in the range of 10 to 20 mol %, more preferably of 15 to 20 mol %, dicyandiamide with respect to the total amount of epoxy units. Also here, the amount of dicyandiamide, based on the overall curable composition, i.e. the $m_d$, is preferably in the range of 3.8 to 4.5 weight %, more preferably 4.1 to 4.4 weight %. Alternatively, if the dicyandiamide is used in combination with said latent amine hardener of formula (V), then the above $m_e$ is preferably in the range of 2.0 to 5.0 mol %, more preferably of 3.0 to 4.0 mol %, dicyandiamide with respect to the total amount of epoxy units. Also here, the amount of dicyandiamide is preferably in the range of 0.3 to 2.0 weight %, more preferably 0.5 to 1.5 weight %, based on the overall composition, and the co-used latent amine hardener of formula (V) is preferably co-used in an amount of 3 to 7 weight %, more preferably of 4 to 6 weight %, based on the overall composition.

The composition of the invention contains as third essential component a curing accelerator, which is an urea derivative of the formula (II):

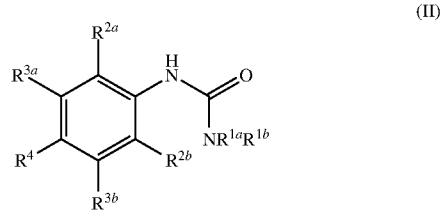
(II)

wherein
- $R^{1a}$ and $R^{1b}$ may be equal or different and are individually selected from the group of hydrogen, $C_1$-$C_6$-alkyl and $C_3$-$C_6$-cycloalkyl; or $R^{1a}$ and $R^{1b}$ taken together with the nitrogen atom to which they are attached form a heterocyclic substituent selected from the group consisting of aziridinyl, azetidinyl, pyrrolidinyl and piperidinyl;
- $R^{2a}$ and $R^{2b}$ are equal or different and are individually selected from the group consisting of hydrogen and $C_1$-$C_6$-alkyl; and
- $R^{3a}$, $R^{3b}$ and $R^4$ are equal or different and are individually selected from the group consisting of hydrogen, halogen, $C_1$-$C_6$-alkyl, $C_1$-$C_6$-alkoxy, $-C(O)R^5$, $-N(H)-C(O)-NR^{1a}R^{1b}$, $-CN$, $NO_2$, trifluoromethyl, $-SOR^6$ and $SO_2R^6$; wherein $R^5$ is selected from the group consisting of hydrogen, $C_1$-$C_6$-alkyl, $C_1$-$C_6$-alkoxy, $C_3$-$C_6$-cycloalkyl and $NR^{1a}R^{1b}$, and $R^6$ is selected from the group consisting of $C_1$-$C_6$-alkyl, $C_1$-$C_6$-alkoxy and $C_3$-$C_6$-cycloalkyl.

These accelerators as such are conventional and some are commercially available. For such accelerators reference is made e.g. to formula (II) of U.S. Pat. No. 4,283,520A, to formula (I) of GB1192790A and to GB2300187A; these publications being included herein by reference.

Preferably in formula (II), $R^{1a}$ and $R^{1b}$ are equal or different and are both $C_1$-$C_6$-alkyl; more preferably, they are both the same $C_1$-$C_6$-alkyl; and most preferably they are both methyl.

Preferably in formula (II), $R^{2a}$ and $R^{2b}$ are different and one of them is hydrogen and the other one is $C_1$-$C_6$-alkyl; more preferably, one of $R^{2a}$ and $R^{2b}$ is hydrogen and the other is methyl.

Preferably in formula (II), one of $R^{3a}$ and $R^{3b}$ is hydrogen and the other one is selected from the group consisting of —C(O)$R^5$, —N(H)—C(O)—N$R^{1a}R^{1b}$, —CN, —SO$R^6$ and SO$_2R^6$, more preferably one of $R^{3a}$ and $R^{3b}$ is —N(H)—C(O)—N$R^{1a}R^{1b}$ and the other one is hydrogen.

Preferably in formula (II), $R^4$ is hydrogen or $C_1$-$C_6$-alkyl.

A more preferred subgroup of compounds of formula (II) have in combination:

$R^{1a}$ and $R^{1b}$ are both methyl;
one of $R^{2a}$ and $R^{2b}$ is hydrogen and the other is methyl;
one of $R^{3a}$ and $R^{3b}$ is —N(H)—C(O)—N$R^{1a}R^{1b}$ and the other one is hydrogen; and
$R^4$ is hydrogen.

Exemplary specific accelerators are commercially available and have substituent patterns in formula (II) according to one of the rows of the following table 1:

TABLE 1

| accelerator No. | $R^{1a}/R^{1b}$ | $R^{2a}/R^{2b}/R^{3a}/R^{3b}$ | $R^4$ |
|---|---|---|---|
| 1 | methyl/methyl | hydrogen/hydrogen/hydrogen/hydrogen | hydrogen |
| 2 | methyl/methyl | hydrogen/hydrogen/chloro/hydrogen or hydrogen/chloro/hydrogen/hydrogen | methyl |
| 3 | methyl/methyl | hydrogen/hydrogen/hydrogen/hydrogen | chloro |
| 4 | methyl/methyl | hydrogen/hydrogen/trifluoromethyl/hydrogen or hydrogen/hydrogen/hydrogen/trifluoromethyl | hydrogen |
| 5 | methyl/methyl | methyl/hydrogen/hydrogen/—N(H)—C(O)—N$R^{1a}R^{1b}$ or hydrogen/methyl/—N(H)—C(O)—$R^{1a}R^{1b}$/hydrogen | hydrogen |

Among these, accelerator No.'s 1 and 5 are preferred, and accelerator No. 5 is the most preferred.

The composition according to the invention preferably comprises the urea derivative of the formula (II) in an amount of 1 to 2 weight %, more preferably of 1.3 to 1.7 weight %, based on the composition.

The composition of the invention, particularly in view of its use for core filling, may optionally contain a reactive diluent having at least one epoxy group, in particular exactly one epoxy group, selected from the group consisting of glycidyl ethers of phenols (such as phenylglycidyl ethers, cresylglycidyl ethers, benzylglycidyl ethers, p-(n-butyl)phenylglycidyl ethers, p-(tert-butyl)phenylglycidylether, nonylphenylglycidylether), glycidyl ethers of Bisphenol A or Bisphenol F or glycidyl ethers of aliphatic or cycloaliphatic alcohols (such as allylglycidylether, butylglycidylether, hexylglycidylether, 2-ethylhexylglycidylether, or glycidyl ethers of natural alcohols such as in particular $C_{8-10}$-alkyl glycidyl ether or $C_{12-14}$-alkyl glycidyl ether). The Bisphenol A or Bisphenol F diluent may be a low viscosity distilled grade or an undistilled technical grade of higher viscosity.

When the composition of the present invention is used in an application requiring fire retardancy, a halogen-free type fire retardant containing substantially no halogen atom may be incorporated. The compositions of the invention then preferably comprise one or more fire retardants selected from the group consisting of:

a) compounds of the following formula (III):

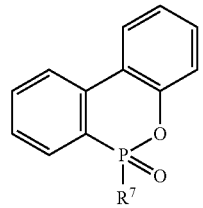

(III)

wherein $R^7$ is selected from the group consisting of hydrogen, alkyl and —(CH$_2$)$_p$COO(CH$_2$)$_q$CH$_3$, wherein p and q are integers of from 2 to 4;

b) ammonium polyphosphate;

c) a phosphate of the general formula (IV):

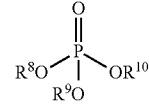

(IV)

wherein $R^8$, $R^9$ and $R^{10}$ may be the same or different and are individually selected from $C_{1-8}$alkyl and phenyl;

and d) aluminium trihydroxide or magnesium hydroxide.

Fire retardants a) are commercially available and known e.g. from DE2646218A1, incorporated herein by reference. Preferably therein, $R^5$ is either hydrogen or —(CH$_2$)$_2$COO(CH$_2$)$_3$CH$_3$. The total amount of fire retardants a), if present, is preferably in the range of 3 to 12% by weight, based on the overall composition of the invention. More preferably, there is either 4 to 8% by weight of compound (III) with $R^7$=—(CH$_2$)$_2$COO(CH$_2$)$_3$CH$_3$, or a combination of 2 to 5% by weight of compound (III) with $R^7$=—(CH$_2$)$_2$COO(CH$_2$)$_3$CH$_3$ and 4 to 6% by weight of compound (III) with $R^7$=H.

Fire retardants b) are commercially available and may be made, as customary in the art, by reacting phosphoric acid (54% P$_2$O$_5$ or higher, such as orthophosphoric acid) with gaseous ammonia, whereby the neutralisation heat, evaporates the water and dehydrates the ammonium polyphosphate, followed by granulation in a pugmill or rotary granulator. Fire retardant b), if present, is preferably used in an amount of 2 to 5% by weight, based on the overall composition.

Fire retardants c) are commercially available. Preferably therein, $R^8$, $R^9$ and $R^{10}$ are the same. More preferably they are all butyl. Fire retardant c), if present, is preferably used in an amount of 4 to 8% by weight, based on the overall composition.

Fire retardants d) are actually hydrated oxides, that is MgO*H$_2$O and Al$_2$O$_3$*3H$_2$O. When subject to elevated temperatures they dehydrate to become inert (noncombustible) MgO and Al$_2$O$_3$, respectively. This dehydration reaction is endothermic and consumes fire heat; the released water acts as a heat reducing agent to hinder fire spread. Fire retardant d) is preferably a powder milled or micronized down to a powder having particle size distribution such that $D_{90}$ is 20 micrometres, that is, 90% of the particles have at the most 20 micrometres particle size. Fire retardant d), if present, is preferably used in an amount of 7 to 20% by weight, based on the overall composition.

Preferably, the composition comprises at least one of the fire retardants of each group a), b), c) and d).

A most preferred composition of the invention comprises as the fire retardant a) either 4 to 8% by weight of compound (III) with $R^7$=—$(CH_2)_2COO(CH_2)_3CH_3$, or a combination of 2 to 5% by weight of compound (III) with $R^7$=—$(CH_2)_2COO(CH_2)_3CH_3$ and 4 to 6% by weight of compound (III) with $R^7$=H; as the fire retardant b) 2 to 5% by weight, based on the composition, of ammonium polyphosphate; as the fire retardant c) 2 to 4% by weight, based on the composition, of tributyl phosphate; and as the fire retardant d) 10 to 17% by weight, based on the composition, of aluminium trihydroxide.

"Halogen" means in the context of the present invention F, Cl, Br or I, more preferably it means Cl.

"Alkyl" means in the present invention branched or unbranched such alkyl, preferably it means unbranched alkyl. The "alkyl" in "alkoxy" has the same meaning.

The use of powdered $B_2O_3$, in particular alone, has been found to both markedly lower the peak heat release rate (peak HRR, in $kW \times m^{-2}$) and to markedly lower the total heat release (THR, in $kW \times m^{-2} \times min^{-1}$) of the cured compositions, when in the form of a prepreg. For this improvement the powdered $B_2O_3$ is preferably used in amounts of 20 to 50% by weight, more preferably 30 to 45% by weight, based on the overall composition of the invention. The $B_2O_3$ may be used for this improvement preferably alone and its purity is here preferably at least 95% by weight, more preferably at least 98% by weight. The particle size of the $B_2O_3$ is for this improvement preferably at the most 149 μm, more preferably at the most 74 μm, obtainable e.g. by sieving through 100 mesh sieve or through 200 mesh sieve, respectively. In either case the lower particle size limit may be open or alternatively may be at least 37 μm, obtainable e.g. by furthermore sieving through a 400 mesh sieve.

The $B_2O_3$ may however be optionally used in combination with aforementioned fire retardants of formulae (III) and (IV), in the respective amount ranges mentioned above.

The contents of $B_2O_3$ in the composition of the invention may be determined by wave dispersion X-ray fluorescence which initially yields the contents of boron, which is then converted by calculation to the $B_2O_3$ content.

On the other hand, it has been found that the use of a $SiO_2$-based frit in the compositions of the invention both markedly lowers the peak heat release rate (peak HRR, in $kW \times m^{-2}$) and markedly lowers the total heat release (THR, in $kW \times m^{-2} \times min^{-1}$) of the cured compositions, when in the form of a "sandwich". This is a structural composite well known in the art, consisting of two prepreg layers sandwiching in between them a hollow reinforcement structure with a two- or three-dimensional lattice, in particular a honeycomb structure, in between them. As a "$SiO_2$-based powdered frit" is understood a powdered frit comprising as a main constituent 50 to 70% by weight, based on the frit, of $SiO_2$. Further components are $Na_2O$ and $K_2O$, in combined amounts of 10 to 30% by weight, more preferably to 30% by weight, of the frit, with the proviso that the amounts of the indicated components add to at least 95% by weight, more preferably at least 98% by weight, of the frit. Within $Na_2O$ and $K_2O$ it is preferred that either there is only $Na_2O$, or that the ratio of the two weight amounts of $Na_2O$ and $K_2O$ is in the range of 15:1 to 0.8 to 1. Further optional components in the frit are $Al_2O_3$, $B_2O_3$, CaO and ZnO in amounts of 0 to 5% by weight, 0 to 40% by weight, 0 to 10% by weight and 0 to 10% by weight, respectively, based on the frit. A yet further optional component is fluorine in amounts of 0 to 5% by weight, wherein the fluorine may be present e.g. as $CaF_2$, NaF or KF.

Three more preferred examples of $SiO_2$-based frits are:

a) 55 to 70% by weight of $SiO_2$, 15 to 25% by weight of $Na_2O$, 0 to 5% by weight of $K_2O$, 5 to 10% by weight of CaO, 0 to 5% by weight of $Al_2O_3$, 5 to 10% by weight of ZnO, and 0 to 5% by weight of fluorine, with the proviso that the amounts of the indicated components add up to at least 98% by weight, preferably at least 99.5% by weight, of the frit.

b) 50 to 60% by weight of $SiO_2$, 10 to 20% by weight of $Na_2O$ and 30 to 40% by weight of $B_2O_3$, with the proviso that the amounts of the indicated components add up to at least 98% by weight, preferably at least 99.5% by weight, of the frit.

c) 60 to 70% by weight of $SiO_2$, 10 to 15% by weight of $Na_2O$, 10 to 15% by weight of $K_2O$, 5 to 10% by weight of CaO and 0 to 5% by weight of $Al_2O_3$, with the proviso that the amounts of the indicated components add up to at least 98% by weight, preferably at least 99.5% by weight, of the frit.

The above mentioned three preferred examples of $SiO_2$-based frits can be used alone and in combination. A more preferred combination is of above a) and b), wherein the weight ratio of frit a) to frit b) is in the range of 2:1 to 1:2, more preferably of 1.5:1 to 1:1.5.

The overall $SiO_2$-based frit, or, in the case of several co-used $SiO_2$-based frits, is preferably present in the composition of the invention in amounts of 10 to 30% by weight, more preferably 20 to 30% by weight, based on the overall composition of the invention.

The $SiO_2$-based frit(s) may optionally be used in combination with aforementioned fire retardants of formulae (III) and (IV), in the respective amount ranges mentioned above.

The components of the $SiO_2$-based frit(s) in the composition of the invention can be determined by X-ray fluorescence spectroscopy, as customary in the art. Namely, X-ray fluorescence is used to initially determine the contents of the metals Si, Al, Ca, K, Na and Zn which are then converted by calculation to corresponding contents of the respective metal oxides. Wave dispersion X-ray fluorescence may yield the contents of boron which are then converted by calculation to $B_2O_3$ contents. Fluorine contents may be determined directly by total reflection X-ray fluorescence.

Still furthermore it has been found that the co-use of a reaction product of a diglycidyl ether of bisphenol A and/or bisphenol F with a carboxy-terminated nitrile rubber in the compositions of the invention improves mechanical properties such as the flexural strength at room temperature of cured prepregs made from such compositions. More preferably here the carboxy-terminated nitrile rubber is a liquid CTNB. For this co-use, said reaction product is preferably employed in amounts of 2 to 7% by weight, more preferably of 3 to 6% by weight, based on the composition. For this use said reaction product preferably has an epoxide equivalent weight EEW in the range of 180-210 g/eq., more preferably of 190 to 200 g/eq.

Optionally, the composition of the invention contains further constituents, in particular auxiliaries and additives customarily used in epoxy resin compositions, provided that they do not interfere with the curing of the composition. Examples for such further constituents are as follows:

wettening or surface-tension lowering agents (such as silicones);

inorganic or organic fillers, in particular ground or precipitated calcium carbonates, which are optionally coated with fatty acids, in particular stearates, barite, talc, quartz flour, quartz sand, iron mica, dolomites, wollastonites, kaolins, mica (potassium aluminium silicate), Molecular sieves, aluminium oxides, aluminium hydroxides, magnesium hydroxide, silicas, cements, gypsum, flyash, soot, graphite, metal powders such as aluminium, copper, iron, zinc, silver or steel, PVC powder or hollow spheres;

Pigments, in particular titanium dioxide and/or iron oxides;

Rheology modifiers, especially thickeners or anti-settling agents;

adhesion promoters, in particular organoalkoxysilanes;

stabilizers against oxidation, heat, light or UV radiation; and surface-active substances, in particular wetting agents, levelling agents, deaerating agents or defoamers.

The composition of the invention may typically comprise glycidyl novolac (I) and optional reactive diluents having at least one epoxy group in a total amount of to 60 weight %, preferably 45 to 55 weight %, based on the composition, wherein the remainder of the composition is made up of dicyandiamide, above optional latent amine hardener of formula (V), above optional fire retardants of groups a)-d) and above optional auxiliaries and additives.

The composition of the invention, particularly when
f of formula (I) is in the range of 2.7 to 2.9;
the EEW is in the range of 172-179 g/eq.; and
the composition comprises as the fire retardant a) a combination of 2 to 5% by weight of compound (III) with $R^5$=—$(CH_2)_2COO(CH_2)_3CH_3$ and 4 to 6% by weight of compound (III) with $R^5$=H; as the fire retardant b) 2 to 5% by weight, based on the composition, of ammonium polyphosphate; as the fire retardant c) 2 to 4% by weight, based on the composition, of tributyl phosphate; and as the fire retardant d) 10 to 17% by weight, based on the composition, of aluminium trihydroxide;

is particularly well suited for manufacture of a prepreg as outlined in the introduction. Preferably here, dicyandiamide is used without latent amine hardener of formula (V), and more preferably in an amount of 3.8 to 4.5 weight %, more preferably 4.1 to 4.4 weight %, based on the overall composition. Furthermore this composition is preferably devoid of abovementioned epoxy-containing reactive diluents. The fibre reinforcement may be any type of inorganic fibre that is customarily used in prepreg manufacture. Examples for the fibres are glass, carbon, aramid or basalt fibres. Preferred are glass fibres, in particular of E-glass. The fibres may be in non-woven or woven form, preferred is the woven form, more particularly the plain-woven or satin-woven form. Most preferred is a woven, in particular satin-woven, E-glass fabric. The fibres are preferably employed in an amount such that they provide 50 to 70% by weight of the finished prepreg.

The prepreg of the invention is preferably essentially or completely solvent-free. It typically has a shelf life of 2 months at room temperature, 6 months at ≤6° C. and 12 months at ≤−6° C.

For the prepreg application, it is preferred that the novolac glycidyl ether has an absolute viscosity at 50° C. of 1000 to 2'000 mPa·s by ASTM D445.

The prepreg of the invention may be used in any applications where epoxy-based prepregs were previously used, in particular in such applications where flame, smoke, toxicity (FST) compliance under the respective national standards are required, Exemplary applications are automobile components (body panels, dashboards, bumpers, hoods, roofs, steering wheels, spoilers), aerospace components (such as air ducts, flooring panels, class dividers, dashboard enclosures, tray tables, light housings, window shades, overhead locker covers, seats, nose cones or even jet turbine blades) marine components (hulls, cabins), electronic circuit boards, and parts for wind turbines (rotor blades, rotor nose cones and generator housings).

The preferred method for producing the prepreg of the invention is the impregnation of a moving fibrous web with a liquid, molten or semi-solid composition of the invention, combined with the appropriate extent of precuring to achieve a desired degree of B-stage curing and tackiness. The prepreg produced may then be cut into sections of the desired size and shape.

The composition of the invention, particularly when
f of formula (I) is in the range of 2.4 to 2.6;
the EEW is in the range of 169-175 g/eq.; and
the composition comprises as the fire retardant a) 4 to 8% by weight of compound (III) with $R^5$=—$(CH_2)_2COO(CH_2)_3CH_3$; as the fire retardant b) 2 to 5% by weight, based on the composition, of ammonium polyphosphate; as the fire retardant c) 2 to 4% by weight, based on the composition, of tributyl phosphate; and as the fire retardant d) 10 to 17% by weight, based on the composition, of aluminium trihydroxide;

is particularly well suited for core filling of hollow reinforcement structures with two- or three-dimensional lattices, such as honeycombs, folded panels or pyramidal trusses particularly in the aerospace field. Preferably here, dicyandiamide is used in combination with a latent amine hardener of formula (V), and the amount of dicyandiamide is preferably in the range of 0.3 to 2.0 weight %, more preferably 0.5 to 1.5 weight %, based on the overall composition, and the co-used latent amine hardener of formula (V) is preferably co-used in an amount of 3 to 7 weight %, more preferably of 4 to 6 weight %, based on the overall composition. Furthermore this composition also preferably comprises one or more of abovementioned epoxy-containing reactive diluents, in amounts of preferably in the range of 10 to 20 weight %, more preferably of 10 to 15 weight %, based on the overall composition. This composition is also well suited for other applications in the aerospace field where thermosetting resins are customarily applied. Examples therefore are edge and corner sealing, insert bonding, insert potting, panel bonding, panel forming, gap filling and local reinforcement for fixation points. The viscosity allows extrusion and good infiltration of the honeycombs. The curing can be done together with curing of a prepreg (of the invention or other) or in a second step after filling the already cured sandwich panel. The cured composition can be machined easily. For the core filling application, it is preferred that the novolac glycidyl ether has an absolute viscosity at room temperature of 8000 to 14'000 mPa·s by ASTM D445, which viscosity may optionally be further lowered by the above mentioned types and amounts of reactive diluents.

The curable resin compositions of the invention are prepared by the known methods, advantageously by simply mixing together the constituents in a suitable mixing apparatus, for example in a ball mill if desired. Optionally, if the components are too viscous at room temperature, they may be mixed at a slightly elevated temperature, such as in the range of 40 to 55° C. It has been observed that the composition of the invention can be safely mixed at such temperatures without significantly triggering curing.

The composition of the invention is stable upon storage at room temperature, even although it contains both the hardener dicyandiamide and the latent accelerator of formula (III) homogeneously admixed with the novolac glycidyl ether.

In cured state, the composition of the invention meets the requirements of standards FAR 25.853 concerning self-extinguishing properties, and ABD0031 concerning FST (fire, smoke, toxicity) characteristics.

Unless otherwise indicated, parts and percentages in the following Examples are by weight.

Example 1. Composition According to the Invention

TABLE 2

| No. | component | function | content in composition (% based on composition) |
|---|---|---|---|
| 1 | novolac glycidyl ether EEW about 175 g/eq.; | epoxy resin, essential component 1 | 56.66 |
| 3 | polyether-modified methyl alkyl polysiloxane copolymer density 0.93 g/cm³ | air release additive | 0.21 |
| 4 | tributyl phosphate | fire retardant | 2.63 |
| 5 | nitrile rubber modified DGEBA EEW 195 g/eq. density 1.17 g/cm³ | tackifier | 11.80 |
| 6 | 6H-dibenz[c,e][1,2]oxaphosphotin-6-propanoic acid, butyl ester, 6-oxide of formula (III), with $R^7 =$ —$(CH_2)_2COO(CH_2)_3CH_3$ | fire retardant | 3.16 |
| 8 | dicyandiamide | hardener essential component 2 | 4.21 |
| 10 | ammonium polyphosphate crystal modification II | fire retardant | 3.69 |
| 11 | 9,10-dihydro-9-oxa-10-phosphaphenanthrene-10-oxide of formula (III), with $R^7 =$ hydrogen | fire retardant | 5.27 |
| 12 | Al(OH)$_3$ | fire retardant | 10.53 |
| 13 | 2,4-bis(dimethylaminocarbonyl-amino)toluene of formula (II), $R^{1a} = R^{1b}$ = methyl; $R^{2a}/R^{2b}$ = hydrogen/methyl or methyl/hydrogen; $R^{3a}/R^{3b}$ = hydrogen/ —N(H)—C(O)—N(CH$_3$)$_2$ or —N(H)—C(O)—N(CH$_3$)$_2$/hydrogen; $R^4$ = hydrogen | accelerator, essential component 3 | 1.84 |
|  | Total |  | 100.00 |

Component No.'s 1, 3, 4, 5 and 6 are mixed with stirring at 40-50° C. for 20 minutes. Then component no. 8 is mixed thereto with stirring for a further 15-20 minutes at the same temperature. Then component no.'s 10, 11 and 12 are mixed thereto with stirring for a further 20-30 minutes at the same temperature. Finally component no. 13, is mixed thereto with stirring for a further 15-20 minutes at the same temperature. The obtained composition according to the invention may be directly used for prepreg manufacture (see example 2 below). Alternatively, the composition may be cooled down to room temperature for storage.

Example 2: Prepreg Preparation

The composition from example 1 is used. The prepreg is prepared on a Menzel type impregnator. The composition of the invention is applied in neat (solvent-free) form at a temperature of 55° C. using a doctor blade in a film of fine thickness on a PET carrier foil. The doctor blade is fed with fresh composition from a bath from which it flows to the doctor blade by its own gravity. The level of composition in the bath is kept constant with a sensor and, if necessary, the bath is replenished by a pump from a reservoir. The thickness of the applied film is given by the gap between the doctor blade and the carrier foil. The resin content of the final prepreg is directly related to the thickness of the composition film. The chosen thickness of the composition film is such that it corresponds to a weight per unit area of about 199 g/m². A reinforcement composed of an E-glass fabric of 296 g/m² (US type 7781) is then superimposed to the composition film on the PET carrier foil, whereby the glass fabric immerses into the semi-solid composition film by its own gravity and due to the wicking capability of the composition, which is improved here due to the polyether-modified methyl alkyl polysiloxane copolymer present in the composition. The obtained impregnated glass fabric laminate is passed through a drying oven of 18 m length, kept at 140° C., for a residence time typically in the range of 4 to 6 min, whereby the extent of B-stage curing of the composition and tackiness may be controlled by choosing the appropriate residence time. The final B-staging may be manually controlled or be be measured by DSC. The resulting prepreg has a weight per unit area of about 495 g/m². It may be wound up on a roll using a PET film as separator foil, in order to prevent the wound-up prepreg layers from sticking together.

Example 3 Composition According to the Invention

TABLE 3

| No. | component | function | content in composition (% based on composition) |
|---|---|---|---|
| 1 | novolac glycidyl ether EEW about 172 g/eq.; | epoxy resin, essential component 1 | 55.66 |
| 2 | ortho-cresyl glycidyl ether | reactive diluent | 4.97 |
| 4 | dicyandiamide | hardener essential component 2 | 1.11 |
| 5 | polyether-modified methyl alkyl polysiloxane copolymer | air release additive | 0.76 |
| 8 | ammonium polyphosphate crystal modification II | fire retardant | 3.85 |
| 9 | Al(OH)$_3$ | fire retardant | 16.54 |
| 11 | fumed silica | processing aid for No. 17 | 2.15 |
| 12 | 2,4-bis(dimethylaminocarbonyl-amino)toluene of formula (II), $R^{1a} = R^{1b}$ = methyl; $R^{2a}/R^{2b}$ = hydrogen/methyl or methyl/hydrogen; $R^{3a}/R^{3b}$ = hydrogen/ —N(H)—C(O)—N(CH$_3$)$_2$ or —N(H)—C(O)—N(CH$_3$)$_2$/hydrogen; $R^4$ = hydrogen | accelerator, essential component 3 | 1.65 |

TABLE 3-continued

| No. | component | function | content in composition (% based on composition) |
|---|---|---|---|
| 14 | 6H-dibenz[c,e][1,2]oxaphosphotin-6-propanoic acid, butyl ester, 6-oxide of formula (III), with $R^7$ = $(CH_2)_2COO(CH_2)_3CH_3$ | fire retardant | 5.55 |
| 15 | tributyl phosphate | fire retardant | 2.20 |
| 17 | commercial reaction product of aliphatic polyamine with epoxide | latent curing agent | 5.55 |
|  | Total |  | 100.00 |

Component No.'s 1, 2, 4, 5, 6, 14 and 15 are mixed with stirring at room temperature for 20 minutes. Then component no.'s 8 and 9 are mixed thereto with stirring for a further 15-20 minutes at room temperature. Then component no. 12 is mixed thereto with stirring for a further 20 minutes at room temperature. Finally component no. 17 is mixed thereto with stirring for a further 20 minutes at room temperature. The obtained composition according to the invention is optionally blended with 32% by weight, based on the composition, of commercial hollow borosilicate glass microspheres of 0.22 g/cm³. In either form, unblended or blended, it is suitable for core filling of e.g. honeycomb structures. It has a gel time of 4-6 m at 140° C. and is storage-stable at room temperature for several months.

Examples 4-6 Compositions According to the Invention

TABLE 4

| | | | content in composition (weight % based on composition) | | |
|---|---|---|---|---|---|
| No. | component | function | Example 4 | Example 5 | Example 6 |
| 1 | novolac glycidyl ether EEW 172-179 g/eq. | epoxy resin, essential component 1 | 50.4 | 46.06 | 44.27 |
| 2 | ortho-cresyl glycidyl ether | reactive diluent | | | |
| 3 | polyether-modified methyl alkyl polysiloxane copolymer density 0.93 g/cm³ | air release additive | 0.18 | 0.18 | 0.18 |
| 4 | dicyandiamide | hardener essential component 2 | 3.74 | 3.74 | 3.59 |
| 5 | nitrile rubber modified DGEBA EEW 195 g/eq. density 1.17 g/cm³ | tackifier | | 4.35 | 8.35 |
| 6 | 6H-dibenz[c,e][1,2]oxaphosphotin-6-propanoic acid, butyl ester, 6-oxide of formula (III), with $R^7$ = —$(CH_2)_2COO(CH_2)_3CH_3$ | fire retardant | 3.91 | 3.91 | 3.76 |
| 8 | ammonium polyphosphate crystal modification II | fire retardant | | | |
| 9 | Al(OH)$_3$ | fire retardant | | | |
| 10 | ammonium polyphosphate crystal modification II | fire retardant | 5.21 | 5.21 | 5.01 |
| 11 | fumed silica | processing aid for No. 17 | 0 | 0 | 0 |
| 12 | 2,4-bis(dimethylaminocarbonyl-amino)toluene of formula (II), $R^{1a} = R^{1b}$ = methyl; $R^{2a}/R^{2b}$ = hydrogen/methyl or methyl/hydrogen; $R^{3a}/R^{3b}$ = hydrogen/—N(H)—C(O)—N(CH$_3$)$_2$ or —N(H)—C(O)—N(CH$_3$)$_2$/hydrogen; $R^4$ = hydrogen | accelerator, essential component 3 | 1.36 | 1.36 | 1.00 |
| 14 | 6H-dibenz[c,e][1,2]oxaphosphotin-6-propanoic acid, butyl ester, 6-oxide of formula (III), with $R^7$ = $(CH_2)_2COO(CH_2)_3CH_3$ | fire retardant | 0 | 0 | 0 |
| 15 | tributyl phosphate | fire retardant | 3.04 | 3.04 | 2.92 |
| 16 | 9,10-dihydro-9-oxa-10-phosphaphenanthrene-10-oxide of formula (III), with $R^7$ = hydrogen | fire retardant | 6.08 | 6.08 | 5.85 |
| 17 | commercial reaction product of aliphatic polyamine with epoxide | latent curing agent | 0 | 0 | 0 |

TABLE 4-continued

| No. | component | function | content in composition (weight % based on composition) | | |
|---|---|---|---|---|---|
| | | | Example 4 | Example 5 | Example 6 |
| 20 | $SiO_2$-based frit A (CaO 7.8%, $K_2O$ 13.0%, $Na_2O$ 11.4%, $Al_2O_3$ 1.4%, $SiO_2$ 66.4%) | fire retardant, | 13.04 | 13.04 | 12.53 |
| 21 | $SiO_2$-based frit C ($Na_2O$ 15.0%, $B_2O_3$ 34.0%, $SiO_2$ 51.0%) | fire retardant | 13.04 | 13.04 | 12.53 |
| 22 | $B_2O_3$, 200 mesh sieved | fire retardant | | | |
| | Total | | 100.00 | 100.01 | 99.99 |

All components except No. 12 are mixed with stirring at room temperature for 20 minutes. Then component no. 12 is mixed thereto with stirring for a further 20 minutes at room temperature.

Example 7: Preparation of Prepregs

Prepregs were prepared following the Airbus Material Specification AIMS05-10-001, issue July 2015, except that the three formulations of Examples 4-6 were used instead of the phenol-formaldehyde resin used there. 16 layers of a 8 shaft satin woven E-glass fibre mat, at 18.5 g/m² each, were laid atop of each other to give a total glass fabric weight of 296 g/m². The 16 layers were impregnated with the respective formulation from Examples 4-6, and the impregnated composites were fully cured for 30 min at 150° C. and 4 bar to obtain monolithic prepregs. The compositions for the impregnated composites and the mechanical and thermal data of the fully cured prepregs obtained therefrom are listed in table 5 below. Therein, comparative prepreg 7f is the commercial PY 8137 marketed by Isovolta, Austria, containing a phenol/formaldehyde resin. The rightmost column indicates respective acceptable value ranges, acceptable minimum values, or acceptable maximum values according to norm AIMS05-10-001.

TABLE 5

| Impregnated composite and prepreg | 7a | 7b | 7c | 7d | 7e | 7f (comparative) | |
|---|---|---|---|---|---|---|---|
| Type of resin formulation (wt % of total impregnated composite) | Example 4 (37.7) | Example 4 (41.5) | Example 4 (38.8) | Example 5 (38.3) | Example 6 (38.8) | | |
| Weight per unit area of fully cured prepreg (in g/m²) | 475 | 506 | 484 | 480 | 484 | 475 | 470-510 |
| "4 points" bending load (in N/mm²) | | 1050 | | 1100 | | 1000 | >700 |
| Flexural strength at RT (in MPa) | 717 | — | 720 | 736 | 677 | 580 | >450 |
| Flexural modulus "$E_{mod}$" at RT (in GPa) | 24.8 | — | 24.8 | 26.7 | 25.8 | 23.7 | >19 |
| Flexural strength at 80° C. (in MPa) | 594 | — | 600 | 428 | 520 | 504 | >270 |
| Flexural modulus "$E_{mod}$" at 80° C. (in GPa) | 22.4 | — | 22.5 | 20.5 | 22.2 | 21.6 | >16 |
| Flexural strength at 95° C. (in MPa) | — | — | 545 | 304 | 436 | | |
| Flexural "$E_{mod}$" at 95° C. (in GPa) | — | — | 21.0 | 17.2 | 20.1 | | |

TABLE 5-continued

| Impregnated composite and prepreg | 7a | 7b | 7c | 7d | 7e | 7f (comparative) | |
|---|---|---|---|---|---|---|---|
| Drum peel strength (in N) | — | — | 56 | 73 | 77 | | >70 |
| peak HRR (in kW/m$^2$) | 58.4 | 65.2 | 46.8 | 50.9 | 61.3 | 47.3 | <65 |
| time to peak HRR (in s) | 11 | 12 | 9 | 10 | 11 | 14 | |
| 2-min THR (in kW × min/m$^2$) | 22.2 | 19.9 | 22.3 | 19.9 | 24 | 26.8 | <40 |
| Specific optical density at 4 minutes (in Ds) | | | 36.14 | 36.17 | | | <10 |

Example 8: Preparation of Sandwich Structures

Sandwich structures consisting of one prepreg layer, one honeycomb structure and a further prepreg layer were prepared following the Airbus Material Specification AIMS05-10-001, issue July 2015. As the two prepregs the ones of Examples 7a-7e and from comparative Example 7f was used. As the honeycomb a meta-Aramid Nomex paper impregnated with phenolic resin of 9.4 mm thickness (Gilcore HD honeycomb, Gill Corporation, conforms to Airbus standard AIMS 11-01-001-A4) was used. The respective prepregs used for the sandwiches and the mechanical and thermal data of the fully cured sandwiches are listed in table 6 below. The rightmost column indicates respective acceptable maximum values according to norm AIMS05-10-001.

TABLE 6

| Sandwich | 8a | 8b | 8c | 8d | 8e | 8f (comparative) | |
|---|---|---|---|---|---|---|---|
| Type of prepregs used, example no. | 7a | 7b | 7c | 7d | 7e | 7f (comparative) | |
| peak HRR (in kW/m$^2$) | 46.3 | 56.7 | 47.6 | 51.6 | 52 | 27.2 | <55 |
| time to peak HRR (in s) | 14 | 17 | 13 | 14 | 17 | 118 | |
| 2-min THR (in kW × min/m$^2$) | 43.1 | 66.2 | 46.6 | 55.7 | 63.2 | 37.7 | |
| Specific optical density at 4 minutes (in Ds) | 36.29 | 47.14 | | | 49.02 | | <100 |

Example 9: Compositions According to the Invention and Thermal Properties of Prepregs and Sandwiches Made Therefrom The prepregs were prepared as described in Example 7 and the sandwiches were prepared as described in Example 8. The following table 7 lists the recipes for the compositions and the thermal properties of the respective prepregs and sandwiches. If in the heading of the table only a bold number is indicated then it refers to the ingredient with same component number of table 4.

TABLE 7

| Recipe No. | 1 | novolac glycidyl ether, EEW about 169-175 g/eq. | Epalloy 8280 | Tactix 556 | MY 0510 | NX-4005 | 3 | 5 | DupoMod DP 5045 | Mowital 75 | 15 | 6 | 16 | DXM11 | S20 Dopo Zn | Safire 400 | Fire-brake 500 | 20 | 21 | 22 |
|---|---|---|---|---|---|---|---|---|---|---|---|---|---|---|---|---|---|---|---|---|
| 21 | 52.66 | | | | | | 0.21 | 15.80 | | | 2.63 | 3.16 | 5.27 | | | | | | | |
| 28 | 30.72 | 13.16 | | | | | 0.18 | | | | 2.63 | 4.83 | 6.58 | | | | | | | |
| 30 | 31.47 | 13.49 | | | | | 0.18 | | | | 3.15 | 4.50 | 7.64 | | | | | | | |
| 33 | 39.37 | | | | | | 0.19 | | | | 2.32 | 2.78 | 8.34 | | | | | | | |
| 34 | | | | 6.95 | | | 0.19 | | | 0.69 | 2.32 | 2.78 | 8.34 | | | | | | | |
| 35 | 36.68 | 9.17 | | | 6.95 | | 0.18 | | | 0.69 | 2.29 | 2.78 | 8.25 | | | | | | | |
| 36 | 36.85 | 9.21 | | | | | 0.18 | | | 0.78 | 2.30 | 2.76 | 8.29 | 8.28 | | | | | | |
| 39 | 35.60 | | | | | 17.80 | | | | 0.78 | 2.23 | 2.67 | 8.01 | 4.01 | | | | | | |
| 40 | 34.14 | | | | | 17.07 | | | | 0.76 | 2.13 | 2.56 | 7.68 | 7.26 | | | | | | |
| 41 | 66.84 | | | | | | 0.34 | | | 1.07 | 2.63 | 3.16 | 5.27 | | | | | | | |
| 42 | 43.56 | 7.92 | | | | | 0.21 | | | 0.67 | 2.38 | 2.38 | 8.32 | 7.13 | | | | | | |
| 43 | 43.56 | | 7.92 | | | | 0.32 | | | 0.67 | 2.38 | 2.38 | 8.32 | 7.13 | | | | | | |
| 44 | 44.65 | | 7.44 | | | | 0.32 | | | 0.63 | 2.23 | 2.23 | 7.82 | 6.70 | | | | | | |
| 45 | 46.93 | | 7.82 | | | | | | | 0.66 | 2.35 | 2.35 | 8.21 | 5.08 | | | | | | |
| 46 | 66.85 | | | | | | 0.21 | | | | 2.63 | 3.16 | 5.27 | | 7.82 | | | | | |
| 47 | 50.85 | 8.47 | | | | | | | | 0.85 | 2.54 | 2.58 | 8.90 | | | 3.69 | | | | |
| 48 | 57.92 | | | | | | 0.21 | | | | 2.63 | 3.16 | 5.26 | | | | 16.95 | | | |
| 49 | 45.75 | | | | | | | | | | 2.29 | 2.29 | 6.86 | | | | 25.00 | | | |
| 51 | 46.51 | 7.62 | | | | | 0.31 | | 1.54 | 0.57 | 2.33 | 2.33 | 5.43 | | | | | 26.69 | | |
| 55 | 51.30 | 7.75 | | | | | 0.19 | | 0.45 | 0.47 | 3.10 | 3.98 | 6.19 | | | | | 24.76 | 29.90 | |
| 58 | 49.54 | | | | | | 0.18 | | | | 2.99 | 3.84 | 8.54 | | | | | | | 27.13 |

TABLE 7-continued

| Recipe No. | Apyral 24 | Apyral 33 | 10 | MK powders | MIP-005 | 4 | 12 | Peak HRR of prepreg (in kW/m²) | 2 min THR of prepreg (in kW·min/m²) | Smoke Density of prepreg (in Ds) | Peak HRR of sandwich (in kW/m²) | 2 min THR of sandwich (in kW·min/m²) | Smoke Density of sandwich (in Ds) |
|---|---|---|---|---|---|---|---|---|---|---|---|---|---|
| 21 | 10.53 | | | | | 4.21 | 1.84 | 91.4 | 32.1 | 30.0 | 74.7 | 73.7 | 64.0 |
| 28 | | 24.13 | 3.69 | | | 3.51 | 1.76 | 57.0 | 27.0 | 45.0 | 50.0 | 46.0 | |
| 30 | | 23.38 | 10.97 | | | 4.05 | 1.80 | | | | 56.7 | 43.7 | 66.0 |
| 33 | | 24.09 | 9.89 | | | 3.47 | 1.62 | | | | 49.9 | 50.4 | 59.0 |
| 34 | | 24.09 | 10.19 | | | 3.47 | 1.62 | 56.3 | 23.2 | | 59.2 | 55.2 | 68.0 |
| 35 | | 23.84 | 10.19 | | | 4.13 | 1.83 | | | | 53.3 | 56.4 | 32.0 |
| 36 | | 17.50 | 10.09 | | | 4.15 | 1.84 | | | | 57.0 | 80.0 | 72.0 |
| 39 | | 8.01 | 7.83 | | | 4.01 | 1.78 | | | | 64.0 | 71.0 | |
| 40 | | 15.36 | 4.01 | 11.13 | | 3.84 | 1.71 | | | | | | |
| 41 | 10.53 | | 6.83 | | | 5.33 | 2.33 | 88.0 | 28.0 | | 55.4 | 65.5 | 78.0 |
| 42 | | 15.05 | 6.73 | | | 3.96 | 1.58 | 76.6 | 27.0 | | | | |
| 43 | | 15.05 | 6.73 | | | 3.96 | 1.58 | 72.5 | 31.0 | | | | |
| 44 | | 14.14 | 6.33 | | | 4.09 | 1.49 | 75.0 | 28.2 | | 65.6 | 77.3 | 62.0 |
| 45 | | 9.78 | 3.13 | | 2.23 | 4.30 | 1.56 | 91.0 | 33.0 | | 69.2 | 75.4 | 50.0 |
| 46 | 10.53 | | | | | 5.33 | 2.33 | 74.6 | 24.0 | | 59.3 | 77.4 | 35.0 |
| 47 | | | 2.54 | | | 4.66 | 1.69 | 84.3 | 31.5 | | 56.7 | 74.8 | 26.0 |
| 48 | | | | | | 4.29 | 1.56 | 79.9 | 25.0 | | 57.0 | 64.4 | 40.0 |
| 49 | | | 1.91 | | | 4.19 | 1.52 | 47.9 | 15.5 | | 47.4 | 58.1 | 28.0 |
| 51 | | | 1.91 | | | 4.26 | 1.55 | 60.2 | 18.5 | | 46.3 | 47.9 | 48.0 |
| 55 | | | 5.31 | | | 3.80 | 1.38 | | | | | | |
| 58 | | | | | | 3.67 | 1.33 | 56.2 | 30.9 | | 46.9 | 56.6 | 52.0 |

The invention claimed is:
1. A curable composition comprising:
i) a glycidyl ether of a novolac, comprising moieties having the formula (I):

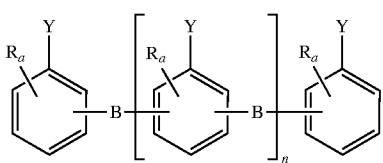

wherein
$R_a$ is either always hydrogen or always methyl;
B is either always *—$CH_2$—** or always

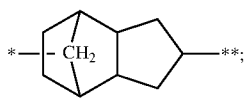

a fraction of 0.8 to 0.99 of the Y moieties are essentially —O-glycidyl, this fraction being designated as x, and the remainder of the Y moieties, this fraction being designated as (1-x), are divalent bridging spacers of the structure *—O—$CH_2$—CH(OH)—$CH_2$—O—** connecting two moieties according to above formula (I); and
n is a number in the range of 0.1 to 3.0;
and wherein said novolac glycidyl ether has an epoxy equivalent weight EEW in the range of 160 to 270 g/eq. and the average number of epoxy groups per molecule of novolac glycidyl ether (I), designated as f, is in the range of 2.1 to 5.0;
ii) dicyandiamide;
iii) an urea derivative of the formula (II):

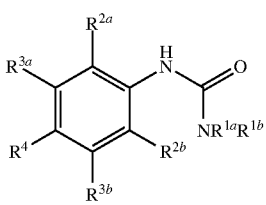

wherein
$R^{1a}$ and $R^{1b}$ may be equal or different and are individually selected from the group of hydrogen, $C_1$-$C_6$-alkyl and $C_3$-$C_6$-cycloalkyl; or $R^{1a}$ and $R^{1b}$ taken together with the nitrogen atom to which they are attached form a heterocyclic substituent selected from the group consisting of aziridinyl, azetidinyl, pyrrolidinyl and piperidinyl;
$R^{2a}$ and $R^{2b}$ are equal or different and are individually selected from the groups consisting of hydrogen and $C_1$-$C_6$-alkyl;
$R^{3a}$, $R^{3b}$, and $R^4$ are equal or different and are individually selected from the group consisting of hydrogen, halogen, $C_1$-$C_6$-alkyl, $C_1$-$C_6$-alkoxy, —C(O)$R^5$, —N(H)—C(O)—$NR^{1a}R^{1b}$, —CN, $NO_2$, trifluoromethyl, —$SOR^6$ and $SO_2R^6$; wherein $R^5$ is selected from the group consisting of hydrogen, $C_1$-$C_6$-alkyl, $C_1$-$C_6$-alkoxy, $C_3$-$C_6$-cycloalkyl and $NR^{1a}R^{1b}$, and $R^6$ is selected from the group consisting of $C_1$-$C_6$-alkyl, $C_1$-$C_6$-alkoxy, and $C_3$-$C_6$-cycloalkyl;
(iv) a powdered $SiO_2$-based frit comprising 50-70% by weight of $SiO_2$, $Na_2O$ and $K_2O$, in combined amounts of 10 to 30% by weight; and $Al_2O_3$, $B_2O_3$, CaO, ZnO and fluorine in amounts of 0 to 5% by weight, 0 to 40% by weight, 0 to 10% by weight, 0 to 10% by weight, and 0 to 5% by weight, respectively; wherein all amounts are based on the frit, with the proviso that the amounts of the indicated components add to at least 95% by weight, of the frit; and the amount of the powdered $SiO_2$-based frit is 10 to 30% by weight, based on the composition;
and
v) optionally, a reactive diluent being selected from the group consisting of glycidyl ethers of monohydric phenols, glycidyl ethers of cresols and glycidyl ethers of aliphatic or cycloaliphatic $C_4$-8-alcohols.

2. The curable composition according to claim 1, furthermore comprising a latent amine hardener of the general formula (V):

$$\underset{R^{14}}{\overset{OH}{R^{13}}}\underset{R^{15}}{\overset{NR^{11}R^{12}}{R^{16}}} \quad (V)$$

wherein
$R^{11}$ and $R^{12}$ are independently selected from hydrogen, $C_1$-$C_6$ alkyl and —$(CH_2)_r$($CHR^{18}N$ ($R^{19}R^{20}$))$R^{21}$ (wherein r is an integer of from 1 to 3; and $R^{18}$, $R^{19}$, $R^{20}$ and $R^{21}$ are independently selected from the group consisting of hydrogen and $C_{1-6}$ alkyl);
$R^{13}$ and $R^{14}$ are independently selected from hydrogen, $C_{1-6}$ alkyl and —$(CH_2)OR^{22}$ (wherein $R^{22}$ is selected from the group consisting of phenyl, cresyl, and xylyl); and $R^{15}$ and $R^{16}$ are independently selected from hydrogen, $C_{1-6}$ alkyl and —$(CH_2)_q$($CHR^{18}N(R^{19}R^{20})$)$R^{21}$ (wherein q is an integer of from 0 to 2; and $R^{18}$, $R^{19}$, $R^{20}$ and $R^{21}$ are as defined above).

3. The curable composition according to claim 1, which is devoid of a latent amine hardener and wherein dicyandiamide is present in an amount in the range of 3.8 to 4.5 weight %, based on the overall composition, and in a ratio $m_e$, with respect to the total amount of epoxy units, in the range of 10 to 20 mol %, said $m_e$ being calculated as $$m_e \equiv 100 \frac{m_{dicy}}{MW_{dicy}} \bigg/ \left( \frac{m_g}{EEW_g} + \sum_{n=1}^{N} \frac{m_n}{EEW_n} \right)$$

wherein
$m_{dicy}$ and $MW_{dicy}$ are the amount (in g) and molecular weight (in g/mol), respectively, of dicyandiamide;
$m_g$ and $EEW_g$ are the amount (in g) and epoxide equivalent weight (in g/eq.), respectively, of the novolac glycidyl ether (I); and
$m_n$ and $EEW_n$ are the amount (in g) and epoxide equivalent weight (in g/eq.), respectively, of the n-th reactive diluent, and the sum runs over all N types of such reactive diluents which are present in the composition.

4. The curable composition according to claim 2, wherein dicyandiamide is present in an amount in the range of 0.3 to 2.0 weight %, based on the overall composition, and in a ratio me, with respect to the total amount of epoxy units, in the range of 2.0 to 5.0 mol % and the latent amine hardener of the general formula (V) is present in an amount in the range of 3 to 7 weight %, based on the overall composition, said $m_e$ being calculated as $$m_e \equiv 100 \frac{m_{dicy}}{MW_{dicy}} \bigg/ \left( \frac{m_g}{EEW_g} + \sum_{n=1}^{N} \frac{m_n}{EEW_n} \right)$$

wherein $m_{dicy}$ and $MW_{dicy}$ are the amount (in g) and molecular weight (in g/mol), respectively, of dicyandiamide;

$m_g$ and $EEW_g$ are the amount (in g) and epoxide equivalent weight (in g/eq.), respectively, of the novolac glydicyl ether (I); and $m_n$ and $EEW_n$ are the amount (in g) and epoxide equivalent weight (in g/eq.), respectively, of the n-th reactive diluent, and the sum runs over all N types of such reactive diluents which are present in the composition.

5. The curable composition according to claim 1, wherein in formula (I), either:

a) B is always *—$CH_2$—**; $R_a$ is always hydrogen; and either the EEW is in the range of 169-175 g/eq. and f is in the range of 2.4 to 2.6, or the EEW is in the range of 172-179 g/eq. and f is in the range of 2.7 to 2.9; or b) B is always *—$CH_2$—**; $R_a$ is always methyl; and the EEW is in the range of 210 to 240 g/eq. and f is in the range of 4.5 to 5.0; or c) B is always

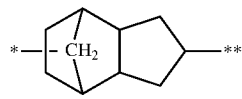

and $R_a$ is always hydrogen; and the EEW is in the range of 220 to 270 g/eq. and f is in the range of 2.1 to 2.5.

6. The curable composition according to claim 1, furthermore comprising a one or more fire retardants selected from the group consisting of:

a) compounds of the following formula (III):

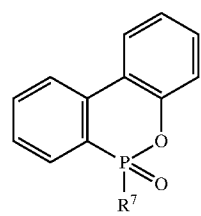

(III)

wherein $R^7$ is selected from the group consisting of hydrogen, alkyl and —$(CH_2)_p COO(CH_2)_q CH_3$, wherein p and q are integers of from 2 to 4;

b) ammonium phosphate;

c) a phosphate of the general formula (IV):

(IV)

wherein $R^8$, $R^9$ and $R^{10}$ may be the same or different and are individually selected from $C_{1-8}$ alkyl and phenyl; and d) aluminium trihydroxide or magnesium hydroxide.

7. The curable composition according to claim 6, comprising as the fire retardant a) either 4 to 8% by weight of compound (III) with $R^5$=—$(CH_2)_2COO(CH_2)_3CH_3$, or a combination of 2 to 5% by weight of compound (III) with $R^5$=—$(CH_2)_2COO(CH_2)_3CH_3$ and 4 to 6% by weight of compound (III) with $R^5$=H;

as the fire retardant b) 2 to 5% by weight, based on the composition, of ammonium polyphosphate;

as the fire retardant c) 2 to 4% by weight, based on the composition, of tributyl phosphate; and as the fire retardant d) 10 to 17% by weight, based on the composition, of aluminium trihydroxide.

8. The curable composition according to claim 1, further comprising 2 to 7% by weight, based on the composition, of a reaction product of a diglycidyl ether of bisphenol A and/or bisphenol F with a carboxy-terminated nitrile rubber.

9. The curable composition according to claim 1, comprising the urea derivative of the formula (II) in an amount of 1 to 2% by weight, based on the composition.

10. A prepreg comprising a fibrous layer and a curable composition according to claim 1.

11. A moulded part comprising a cured prepreg according to claim 10.

12. A sandwich comprising two prepregs according to claim 10 and a hollow reinforcement structure sandwiched between the two prepregs.

13. The moulded part according to claim 11, wherein the moulded part is an air duct or a floor panel for an aircraft.

14. The sandwich according to claim 12, wherein the hollow reinforcement structure is a honeycomb.

15. A curable composition comprising:

i) a glycidyl ether of a novolac, comprising moieties having the formula (I):

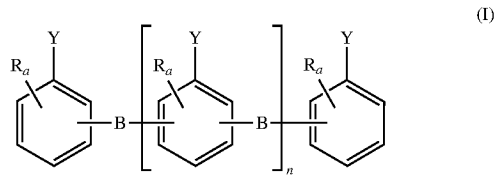

(I)

wherein $R_a$ is either always hydrogen or always methyl;

B is either always *—$CH_2$—** or always

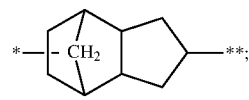

a fraction of 0.8 to 0.99 of the Y moieties are essentially —O-glycidyl, this fraction being designated as x, and the remainder of the Y moieties, this fraction being designated as (1-x), are divalent bridging spacers of the structure *—O—$CH_2$—CH(OH)—$CH_2$—O—** connecting two moieties according to above formula (I); and n is a number in the range of 0.1 to 3.0;

and wherein said novolac glycidyl ether has an epoxy equivalent weight EEW in the range of 160 to 270 g/eq. and the average number of epoxy groups per molecule of novolac glycidyl ether (I), designated as f, is in the range of 2.1 to 5.0;

ii) dicyandiamide;

iii) an urea derivative of the formula (II):

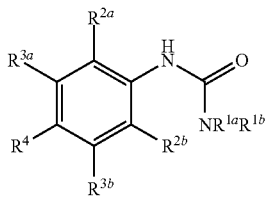

(II)

wherein $R^{1a}$ and $R^{1b}$ may be equal or different and are individually selected from the group of hydrogen, $C_1$-$C_6$-alkyl and $C_3$-$C_6$-cycloalkyl; or $R^{1a}$ and $R^{1b}$ taken together with the nitrogen atom to which they are attached form a heterocyclic substituent selected from the group consisting of aziridinyl, azetidinyl, pyrrolidinyl and piperidinyl;

$R^{2a}$ and $R^{2b}$ are equal or different and are individually selected from the groups consisting of hydrogen and $C_1$-$C_6$-alkyl;

$R^{3a}$, $R^{3b}$, and $R^4$ are equal or different and are individually selected from the group consisting of hydrogen, halogen, $C_1$-$C_6$-alkyl, $C_1$-$C_6$-alkoxy, —C(O)$R^5$, —N(H)—C(O)—$NR^{1a}R^{1b}$, —CN, $NO_2$, trifluoromethyl, —$SOR^6$ and $SO_2R^6$; wherein $R^5$ is selected from the group consisting of hydrogen, $C_1$-$C_6$-alkyl, $C_1$-$C_6$-alkoxy, $C_3$-$C_6$-cycloalkyl, and $NR^{1a}R^{1b}$, and $R^6$ is selected from the group consisting of $C_1$-$C_6$-alkyl, $C_1$-$C_6$-alkoxy, and $C_3$-$C_6$-cycloalkyl;

iv) powdered $B_2O_3$ in an amount of 20 to 50% by weight, based on the overall composition;

v) one or more compounds of the following formula (III):

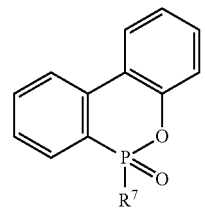

(III)

wherein $R^7$ is selected from the group consisting of hydrogen, alkyl and —$(CH_2)_p$COO$(CH_2)_q$$CH_3$, wherein p and q are integers of from 2 to 4; the total amount of these fire retardants being 3 to 12% by weight, based on the overall composition; and vi) optionally, a reactive diluent being selected from the group consisting of glycidyl ethers of monohydric phenols, glycidyl ethers of cresols and glycidyl ethers of aliphatic or cycloaliphatic $C_{4-8}$-alcohols.

16. The curable composition according to claim 15, comprising the $B_2O_3$ in an amount of 30 to 45% by weight, based on the overall composition.

* * * * *